(12) United States Patent
Yin et al.

(10) Patent No.: US 6,961,355 B1
(45) Date of Patent: Nov. 1, 2005

(54) VARIABLE POWER PULSED SECONDARY BEAM LASER

(75) Inventors: Yusong Yin, Stonybrook, NY (US);
Xiaojie Zhao, Stonybrook, NY (US);
Jing Zhao, Centereach, NY (US);
Samuil Karlsbrun, Oakdale, NY (US)

(73) Assignee: Photonics Industries, Int'l., Bohemia, NY (US)

( * ) Notice: Subject to any disclaimer, the term of this patent is extended or adjusted under 35 U.S.C. 154(b) by 0 days.

(21) Appl. No.: 10/339,241

(22) Filed: Jan. 9, 2003

(51) Int. Cl.[7] ................................................ H01S 3/10
(52) U.S. Cl. .......................................... 372/25; 372/26
(58) Field of Search ............................ 372/10, 22–23, 372/11–13, 25–26

(56) References Cited

U.S. PATENT DOCUMENTS

| | | | | |
|---|---|---|---|---|
| 4,181,899 A | * | 1/1980 | Liu | 372/22 |
| 4,841,528 A | * | 6/1989 | Sipes et al. | 372/22 |
| 5,197,074 A | * | 3/1993 | Emmons et al. | 372/26 |
| 5,218,609 A | * | 6/1993 | Oda | 372/20 |
| 5,237,578 A | * | 8/1993 | Amano | 372/22 |
| 5,268,912 A | * | 12/1993 | Tatsuno et al. | 372/22 |
| 5,317,447 A | * | 5/1994 | Baird et al. | 359/328 |
| 5,339,323 A | | 8/1994 | Hunter et al. | |
| 5,625,633 A | * | 4/1997 | Ichimura et al. | 372/32 |
| 5,898,717 A | * | 4/1999 | Yin | 372/22 |
| 6,009,110 A | * | 12/1999 | Wiechmann et al. | 372/10 |
| 6,108,356 A | | 8/2000 | Yin | |
| 6,172,331 B1 | * | 1/2001 | Chen | 219/121.71 |
| RE37,485 E | | 12/2001 | Vestal | |
| 6,529,540 B1 | * | 3/2003 | Demmer et al. | 372/92 |
| 6,587,483 B2 | * | 7/2003 | Kittelmann et al. | 372/13 |

* cited by examiner

Primary Examiner—Hoanganh Le
Assistant Examiner—Hung Tran Vy
(74) Attorney, Agent, or Firm—James A. Quinton (57) ABSTRACT

Lasers are provided to deliver a wide variety of wavelengths at variable pulse energy. A laser cavity is formed between a first and second reflective surface. A lasing medium is located within cavity which lases at a preselected fundamental frequency. One or more nonlinear crystals are provided in optical communication with the lasing crystal to produce a secondary beam having a different frequency than the fundamental beam. A modulator is provided to control the pulse energy of the secondary beam. Desirably the secondary beam is a harmonic beam for example a second, third, fourth or fifth harmonic beam or a beam provided by an optical parametric oscillator.

25 Claims, 7 Drawing Sheets

VARIABLE POWER PULSED SECONDARY BEAM LASER

FIELD OF THE INVENTION

The invention relates to a method of controlling the pulse energy of a secondary frequency beam from a laser which lases at a primary frequency. The invention also relates to a harmonic laser having a variable pulse energy output and to methods of using the laser.

BACKGROUND OF THE INVENTION

High powered lasers which provide secondary output beams at a different wavelength than the fundamental beam at which the laser lases have been made. For example, second, third and fourth harmonic intracavity lasers have been provided. See for example U.S. Pat. No. 5,898,717. The use of harmonic lasers or optical parametric oscillators enables a wide range of wavelengths to be supplied by reliable lasers such as the Nd:YAG, Nd:YLF or Nd:YVO$_4$. See U.S. Pat. No. 6,108,356. In the case of the third and fourth harmonic lasers, powerful UV lasers can be provided. However, many applications require a variable power output, particularly for UV lasers. Thus, the user at one time will require a certain power and will also desire to adjust the laser to another lower or higher power. It is particularly desired to control the pulse energy of a harmonic laser.

Numerous patents are directed to controlling fundamental beam output. For example, U.S. Pat. No. 5,197,074 (Emmons) discloses a laser that it is capable of generating a laser output having preserved mode quality, waste position and output divergence as well as a selectable amplitude within a relative range of amplitudes and a selectable duration. Another example of a fundamental laser output control is shown by U.S. Pat. No. 5,339,323 (Hunter). This patent discloses the control of the laser pulse by a high loss time duration control signal supplied to a Q-switch. There is still a need in the art for lasers which produce variable power secondary output beams.

Lasers have been used in biological analysis using a matrix assisted laser desorption and ionization technique. See U.S. Pat. No. RE37,485. Such technique is useful in the biotech industry as it allows rather accurate analysis of the presence of biological components. In such systems, a matrix is added to the biological sample. The matrix absorbs UV laser energy typically a wavelength of from about 325 nm to 375 nm. A pulsed UV laser beam is used to ionize the biological sample mixed with the matrix which absorbs energy at approximately 325 nm to 375 nm. The ionized sample is then analyzed in a mass spectrometer. Depending on the type of sample or the component sought or both, different amounts of energy need to be supplied to the matrix to obtain optimal results.

Generally, in the prior art, nitrogen lasers which lase at 337 nm have been used. Nitrogen lasers are gas lasers. They are difficult to maintain and have a short useful life. The power of the nitrogen laser beam is controlled by using an attenuator which can be rotated to provide the desired power to a biological sample. Such a device is not desirable because the attenuator is mechanically operated and can have a significant time lag. Moreover, mechanical parts are unreliable and slow in response compared to a solid state device.

SUMMARY OF THE INVENTION

According to the invention, a pulsed laser beam delivery system and a method of pulsing a laser are provided. The laser can supply a wide variety of pulsed secondary output wavelength beams from a fundamental wavelength beam from a lasing crystal or other source at a variable pulse energy. Shorter wavelength beams can be provided by passing a fundamental beam through a harmonic nonlinear crystal to provide second, third, fourth or fifth harmonic beams. Alternatively, when a longer wavelength beam than the fundamental beam is sought, an optical parametric oscillator (OPO) can be used. Such devices employ opo nonlinear crystals. In another aspect of the invention, a method of providing pulsed secondary output beams having a controlled variable pulse energy is provided.

According to the invention, lasers are provided to deliver a wide variety of wavelengths at variable pulse energy. A laser cavity is formed between a first and second reflective surface. A lasing medium is located within the cavity which lases at a preselected fundamental frequency. One or more nonlinear crystals are provided in optical communication with the lasing crystal to produce a secondary beam having a different frequency than the fundamental beam. A modulator is provided to control the pulse energy of the secondary beam without changing the laser repetition rate. Desirably the secondary beam is a harmonic beam for example a second, third, fourth or fifth harmonic beam or a beam provided by an optical parametric oscillator.

In another aspect of the invention, a method of producing a variable pulse energy laser beam is provided. According to the invention, a laser cavity is formed between a first and second reflective surface. The cavity has a laser medium located within the cavity for producing a primary beam. One or more nonlinear crystals are located within the cavity for producing at least one secondary beam from the primary beam. The laser is pumped by a pump source e.g. a diode, diode array, lamp pump or other appropriate pumping source. A modulator located within the cavity is activated to induce a loss rate for the primary beam to prevent lasing of the laser within the cavity. The modulator also induces a variable intracavity loss rate of the primary beam through a preselected range of loss rates that nevertheless allow lasing. The preselected range of loss rates of the primary beam corresponds to preselected range of pulse energy delivered by the secondary beam. A desired pulse energy is then selected from the range of preselected pulse energies. The intracavity loss rate of the primary beam is then changed within the range of loss rates induced by the modulator to the loss rate corresponding to the preselected pulse energy of the secondary beam. The resulting pulsed beam having a variable pulse energy is then directed outside the cavity.

In a further aspect of the invention, a method for analyzing a biological sample is provided. According to the invention a carrier matrix absorptive of UV radiation is mixed with a biological sample for analysis to form a test sample. At least a part of the test sample is applied to a target and dried. The target is then inserted in a mass spectrometer. A solid state harmonic laser having a controlled variable pulse energy according to the invention is then pulsed as described above. Such lasers are selected to lase at a preselected frequency. The solid state laser has a harmonic generator located intracavity to produce a harmonic UV beam intracavity having a preselected frequency which is selectively absorbed by the matrix but not absorbed by the biological sample. The pulsed UV beam produced by the solid state laser is then directed outside the cavity to contact the target. The matrix absorbs the radiation and the biological sample is ionized and analyzed by the mass spectrometer to identify one or more component in the sample, e.g., peptide or proteins. A modulator is provided in the laser cavity for selectively varying the pulse energy of the harmonic beam.

In another aspect of invention, a method for controlling at least two UV beams having different pulse energy levels for VIA hole drilling is provided. According to the invention, at least two layers of a printed circuit board having at least one metal layer, and at least one dielectric layer are drilled. The UV laser according to the invention emits higher pulse energy to drill through the metal layer. The pulse energy is changed to a lower level within the time period between two pulse interval to drill through the dielectric layer without substantially damaging the surrounding area of the layer. When multiple layers are present, the pulse energy level of the second pulse is not enough to drill through the next metal layer.

The preferred embodiment of the present invention is illustrated in the drawings and examples. However, it should be expressly, understood that the present invention should not be limited solely to the illustrative embodiment.

DETAILED DESCRIPTION OF THE INVENTION

According to the invention, a pulsed laser beam delivery system is provided which supplies a wide variety of secondary output wavelength beams from a fundamental wavelength beam from a lasing crystal or other source beam at a variable pulsed energy. Shorter wavelength beams can be provided by passing a fundamental beam through a harmonic nonlinear crystal, for example, a LBO or BBO nonlinear crystal to provide second, third, fourth or fifth harmonic beams. Alternatively, when a longer wavelength pulsed beam than the fundamental beam is sought, an optical parametric oscillator (OPO) can be used. Such devices employ OPO nonlinear crystals.

According to the invention, lasers are provided to deliver a wide variety of wavelengths at variable pulse energy for the secondary beams generated preferably using the efficient and reliable Nd:YAG, Nd:YLF and Nd:YVO$_4$ laser crystals. A laser cavity is provided between a first and second reflective surface. A lasing medium is provided which lases at a preselected fundamental frequency. One or more nonlinear generators preferably nonlinear crystals are provided in optical communication with the lasing crystal as a nonlinear output coupler to produce a secondary beam having a different frequency than the fundamental beam. A modulator is provided to control the pulse energy of the secondary beam by varying the intracavity loss rate of the primary beam over a preselected range of settings including at least one setting that will prevent lasing without changing the repetition rate. Desirably the secondary beam is a harmonic beam for example a second, third, fourth or fifth harmonic beam or a beam provided by an optical parametric oscillator. Preferably, the harmonic beam is a second, third or fourth harmonic beam and the nonlinear crystal is LBO, BBO or KUP or other suitable nonlinear generator or generators. A controller is provided to vary the loss rate induced by the modulator over the preselected range to control the pulse energy delivered by the laser as desired by the user. As a result, the amount of pulse energy delivered by the laser can be controlled over the preselected range. Desirably, the range is between 0 and the maximum pulse energy of the secondary beam, preferably the range is from 10% to the maximum The modulator is located within the laser cavity. Desirably the modulator is an acoustooptic or an electrooptic modulator to control the pulse energy of the secondary beam produced. Desirably, an acoustooptic modulator, preferably a radio frequency modulator having a transducer for supplying the radio frequency waves at a series of selectable heights is provided.

According to the invention, a controller is provided in communication with the modulator. The controller controls the radio frequency wave in the case of an acoustooptic modulator or the electrical voltage signal in the case of an electrooptic modulator. Desirably, the controller provides an adjustable radio frequency wave to the modulator. Acoustooptic modulators are generally transparent to beams propagating from a laser medium. However, when they are subjected to a radio frequency wave, the beam is deflected in the modulator which can disrupt lasing. There is generally a minimum amplitude of the radio frequency wave required which will prevent lasing. It has been found that by controlling the amplitude of the radio frequency wave below the amount required to completely disrupt the lasing of the laser material, the pulsed energy of the secondary beam, preferably a harmonic beam, can be controlled. Thus, by varying the radio frequency amplitude desirably between 0 and K the amplitude required to stop lasing altogether, a secondary beam having a controllable variable pulse energy can be provided. Thus, depending on the desired pulse energy required, the amplitude of the radio wave is reduced from the amount required to prevent lasing, to a value between 0 (where maximum pulse energy occurs) to various amplitude values between 0 and K to produce a pulse having a controlled variable pulse energy corresponding to the amplitude height supplied to the modulator.

In a further aspect of the invention, a method of providing a variable pulse energy secondary beam is provided. According to the invention, a laser cavity is provided preferably a reliable Nd:YAG, Nd:YLF or Nd:YVO$_4$ laser cavity. Within the laser cavity is a nonlinear crystal for producing a secondary beam, preferably a harmonic crystal for producing a harmonic beam preferably a third harmonic beam, optionally, an OPO crystal for producing a longer wave length beam. A modulator is placed in the cavity.

In operation, according to the invention the modulator is supplied with power, for example, a radio frequency or an electric voltage, preferably a radio frequency. The modulator has a certain setting required to prevent lasing. According to the invention, a variable power output secondary beam is produced by varying the power supplied to the modulator in controlled amounts. The result is a pulsed secondary beam having a controlled variable pulse energy.

According to the invention, a laser is pumped by a pump source e.g. a diode, diode array, lamp pump or other appropriate pumping source. A modulator such as an acoustooptic or an electrooptic modulator preferably an acoustooptic modulator, located within the cavity, is activated to induce a loss rate for the primary beam to prevent lasing of the laser within the cavity. The modulator also induces a variable intracavity loss rate of the primary beam through a preselected range of loss rates that nevertheless allow lasing. The preselected range of loss rates of the primary beam corresponds to a preselected range of pulse energy delivered by the secondary beam. At least one pulse energy between 0 and the maximum is provided and preferably one or more in addition to the 0 pulse energy and the maximum pulse energy for a total of three or more different pulse energies.

A modulator, preferably an acoustooptic modulator, is activated by supplying radio frequency wave to the modulator. The RF waves have a preselected range of amplitudes corresponding to the preselected range of pulse energies of the secondary beam. At least one of the amplitudes deflects a sufficient portion of the primary beam to prevent lasing. Other amplitudes of sound waves are supplied that allow lasing. Such other amplitudes when supplied to the modulator induce loss rates that correspond to preselected pulse energy of the secondary beam. As a result, by supplying a specific amplitude after the laser beam has been pumped but prevented from lasing, a preselected pulse energy corresponding to the amplitude supplied is obtained. Thus, a method of providing a variable pulse energy laser beam of a secondary beam is provided. The resulting pulsed beam having a variable pulse energy is then directed outside the cavity.

In a further aspect of the invention, a method for analyzing a biological sample is provided. According to the invention a carrier matrix absorptive of UV radiation is mixed with a biological sample for analysis to form a test sample. Matrixes are used depending on the component sought. For example, sinapinic acid is useful for protein analysis and cyano-4-hydrooxycinnamic acid is useful for peptide analysis. At least a part of the test sample is applied to a target and dried. The resulting dried mounted sample is then inserted in a mass spectrometer. A solid state laser according to the invention is then pulsed as described above. Such lasers are selected to lase at a preselected frequency. The solid state laser has a harmonic generator preferably a third harmonic generator located intracavity therein to produce a secondary beam, namely a harmonic UV beam preferably a third harmonic beam intracavity having a preselected frequency which is selectively absorbed by the matrix but not absorbed by the biological sample. Desirably, a frequency of about 325 nm to about 375 nm is desired. Preferably, a wavelength of about 351 nm or 355 nm is desirable. The pulsed UV beam produced by the solid state laser is then directed outside the cavity to contact the target. The matrix absorbs the radiation and the biological sample is ionized and analyzed by the mass spectrometer to identify one or more component in the sample, e.g., peptide or proteins. A modulator is provided as described above in the laser cavity for selectively varying the pulse energy of the harmonic beam preferably a third harmonic beam depending on the sample and component sought.

There are numerous applications where variable UV power or pulse energy is desired. For example, VIA hole drilling for multilayer circuit boards, requires a UV pulse energy to drill through a metal layer which is quite different from the pulse energy required for dielectric layers. With a high pulse rate such from about 1 kHz to 100 kHz, it is not efficient or practical to use a mechanical beam attenuator to control the pulse energy. It is desirable to control the UV pulse energy within a very short time such as in the order of or less than 1 micro second. According to invention, a method for controlling at least two pulse energy levels UV beams for VIA hole drilling is provided. At least two layers of a printed circuit board having at least one metal layer, and at least one dielectric layer are drilled. The UV laser emits a high pulse energy to drill through the metal layer. The pulse energy is lowered within the time period between two pulse interval, to drill through the dielectric layer without damaging the surrounding area of dielectric layer. When multiple layers are present, the energy level is not enough to drill through the next metal layer.

Figure 1:
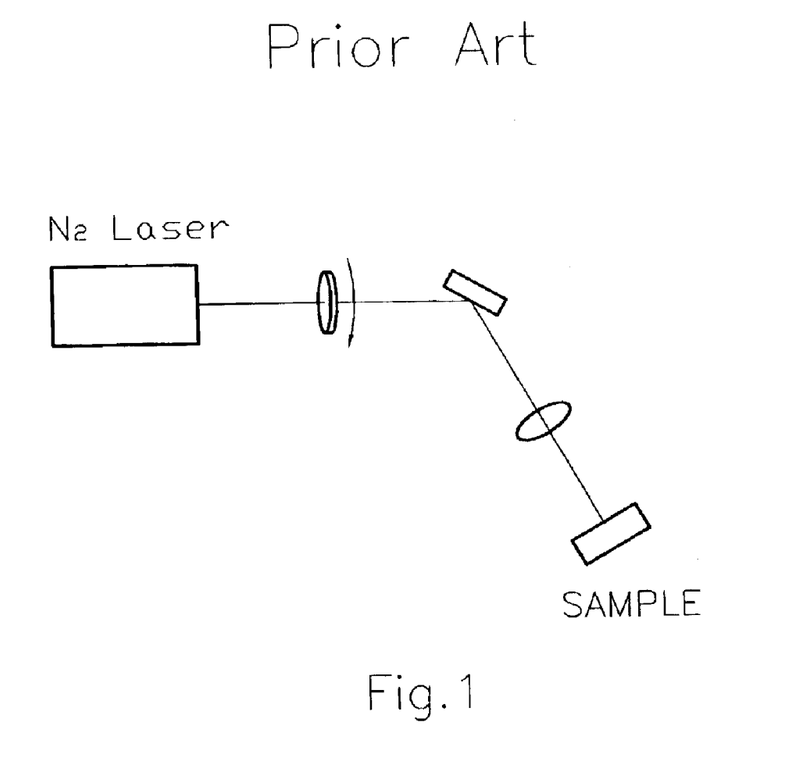
FIG. 1 is a schematic view of a laser of the prior art.
Figure 2A:
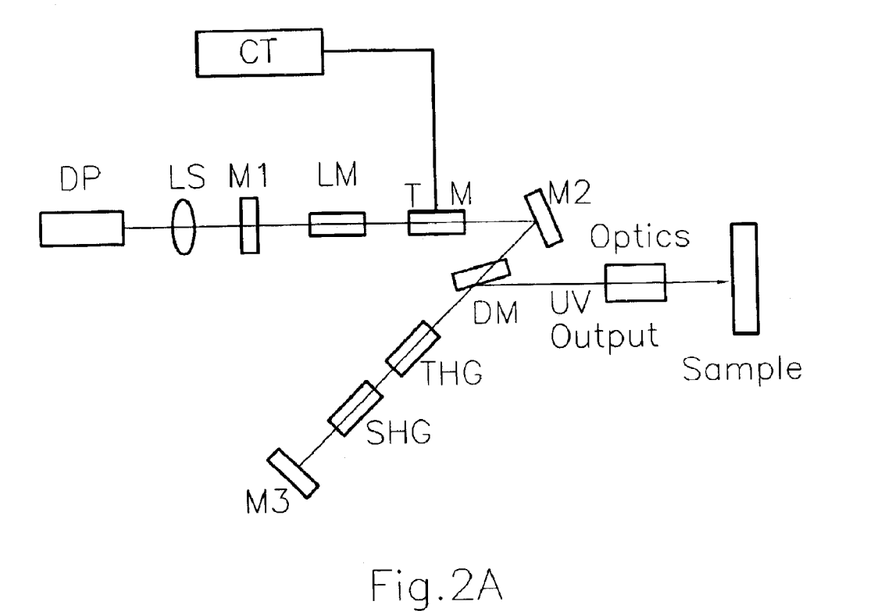
FIG. 2A is a schematic view of a laser according to the invention.

Referring now to the figures as shown in FIG. 2A, a laser is provided. According to the invention, a laser cavity is provided between mirrors M1 and M3. Mirrors M1 and M3 are reflective preferably highly reflective for fundamental beam. Mirror M3 is also highly reflective for second harmonic beam. Lasing material LM is provided within the cavity for lasing at a preselected fundamental beam wavelength. Preferably the lasing material LM is Nd:YLF, Nd:YAG or Nd:YVO$_4$ laser crystal. A modulator M is provided within the cavity. According to the invention, an acoustooptic or an electorooptic modulator is desirably provided to control the pulse energy of a secondary beam. Preferably an acoustooptic modulator with a controller CT for controlling the amplitude of the radio frequency to a series of selectable heights is provided. A reflecting mirror, preferably a folding mirror M2, which is highly reflective for fundamental beam, is provided in optical communication with modulator M. A dichoric mirror DM which is highly transmissive for fundamental beam and highly reflective for UV beam preferably third harmonic beam is provided in optical communication with folding mirror M2 along the optical axis within the optical cavity. A third harmonic generator THG (1w+2w=3w) is located within the laser cavity along the optical axis between mirrors M3 and DM. A second harmonic generator SHG is provided in optical communication with third harmonic generator THG along the optical axis. Desirably, SHG is a BBO, LBO or KTP nonlinear crystal and THG is a BBO or LBO nonlinear crystal.

In operation, diode pump DP is energized to supply energy to the lasing medium LM. Mirror M1 is highly transmissive for the pumping wavelength. The diode pump beam is directed through focusing system LS to focus the beam as desired. When the laser lases, the fundamental beam is directed to modulator M which will be discussed in greater detail below. Energy propagating through modulator M is directed to mirror M2 which is highly reflective for fundamental beam and directs fundamental beam to dichoric mirror DM which is highly transmissive for fundamental beam. The fundamental beam is then directed to a third harmonic crystal THG which produces a third harmonic beam in the presence of fundamental and second harmonic beam. Since there is no second harmonic beam present on the first pass, the fundamental beam passes through third harmonic generator THG unaffected. The fundamental beam is then directed to second harmonic generator SHG where a portion of the fundamental beam is converted to second harmonic beam. Mirror M3 which is highly reflective for fundamental and second harmonic beam reflects fundamental and second harmonic back through the second harmonic generator where a further portion of the fundamental beam is converted to second harmonic. Second harmonic and fundamental beam propagating from the second harmonic generator is directed through third harmonic generator where a portion of the fundamental and the substantial portion of the second harmonic beam are converted to third harmonic beam. The beams propagating from the third harmonic generator are then desirably directed to dichoric mirror DM which reflects UV beam, preferably third harmonic beam outside the cavity. Dichoric mirror DM is highly transmissive for fundamental beam and transmits the fundamental beam to mirror M2 which is highly reflective for fundamental beam and directs the fundamental beam back through modulator M and back through laser medium LM for amplification.

Desirably, the modulator M is made from a material that is generally transparent, that is transmissive of fundamental beam unless it is subjected to a radio frequency. Desirably, a fused silica material is used. Such materials are transparent to fundamental wavelength beam when there is no radio frequency passing through the modulator.

Figure 5A:
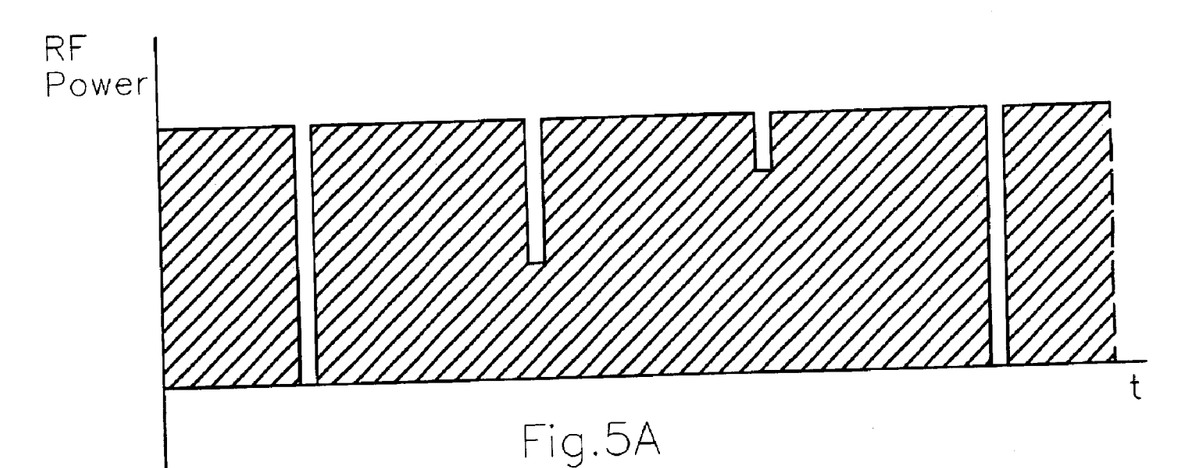
FIGS. 5A and 5B are graphs showing the relationship of RF power and pulse energy of the secondary beam for an acoustooptic modulator according to the invention.

A controller CT is provided in communication with the modulator M. For an acoustooptic modulator, a controller CT controls a transductor T located on the surface of modulator M optical part to provide an adjustable radio wave to modulator M. By varying the depth of modulation of the radio frequency (RF), the pulse energy of the harmonic beam can be controlled. As seen in FIG. 5A, which is a graph of radio frequency power verses time, and FIG. 5B which graph of laser pulse energy vs. time, it can be seen that as the amplitude of modulation of RF decreases, the pulse energy of the harmonic beam increases.

Figure 2B:
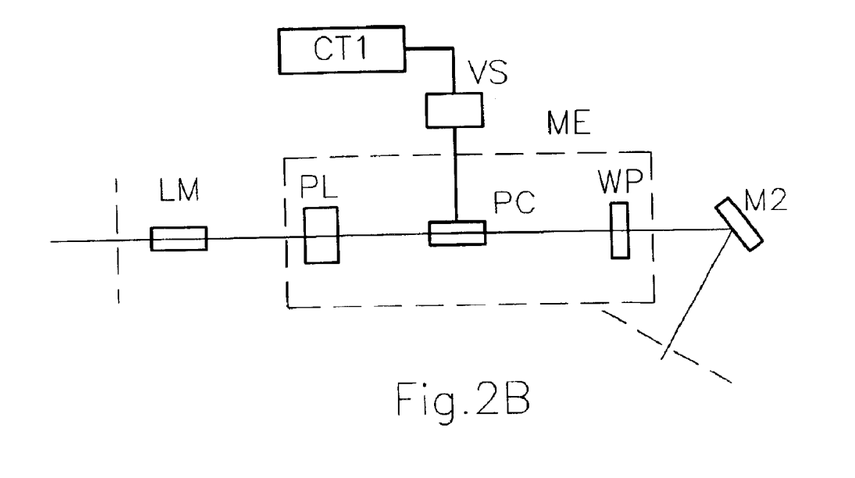
FIG. 2B is a partial schematic view showing an alternative embodiment of the laser according to the invention.

Referring now to FIG. 2B, an electrooptic modulator for use according to the invention is shown. FIG. 2B shows a partial schematic sketch similar to FIG. 2A except the acoustooptic modulator has been replaced with an electrooptic modulator ME located between the laser medium and the folding mirror M2. Desirably, the electrooptic modulator ME includes a pockels cell PC, a polarizer PL and a quarter wave plate WP. Other electrooptic modulator arrangements are possible. As shown in FIG. 2B, polarizer PL is desirably located adjacent to the laser medium LM. In optical communication with the polarizer is a pockels cell PC. In optical communication with the pockels cell PC is a wave plate WP, preferably, a quarter wave plate. In optical communication with the wave plate WP is folding mirror M2. A controller CT1 is provided to signal voltage supply VS to provide a variable voltage over a preselected range to pockels cell PC.

In operation, a fundamental beam propagating from the laser medium propagates through the polarizer PL to the pockels cell PC. When there is no voltage across the pockels cell, the beam is not affected. The beam is then directed through wave plate WP which is a quarter wave plate which rotates the polarization one-quarter to become circular polarized beam. The fundamental beam is then reflected by mirror M2 and directed to mirror M3 where it is reflected back across the various harmonic crystals to mirror M2 and back through the wave plate WP where the polarization is again rotated one-quarter wave. The beam then passes through the pockels cell PC which, in the absence of an applied voltage is transparent to the fundamental beam. The beam is then directed to polarizer PL which will block the one-half wave rotated beam and prevent lasing. The pockels cell will rotate the polarization of the fundamental beam propagating through the pockels cell depending upon the amount of voltage applied to the pockels cell. A one-quarter wave voltage to 0 voltage desirably can be applied. The amount of voltage applied is related to the pulse energy reflected by dichoric mirror DM. Practically, the pockels cell has an applied voltage between one-quarter and about zero.

Figure 3A:
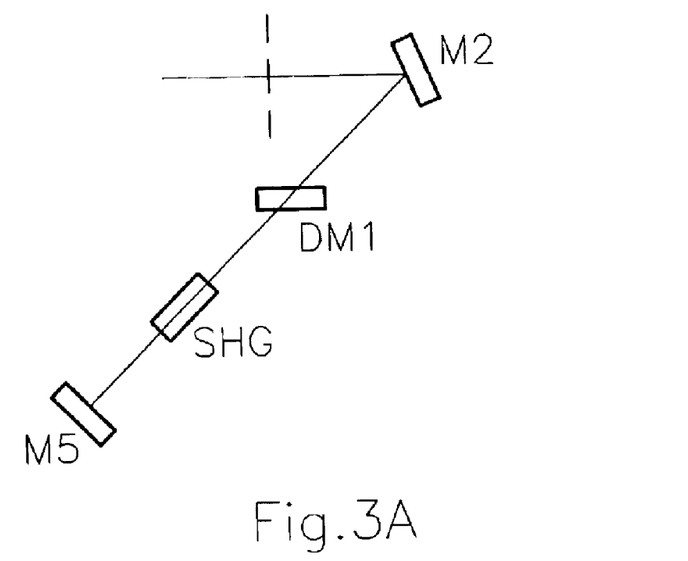
FIGS. 3A and 3B are partial schematic views showing alternative embodiments of the laser according to the invention.
Figure 3B:
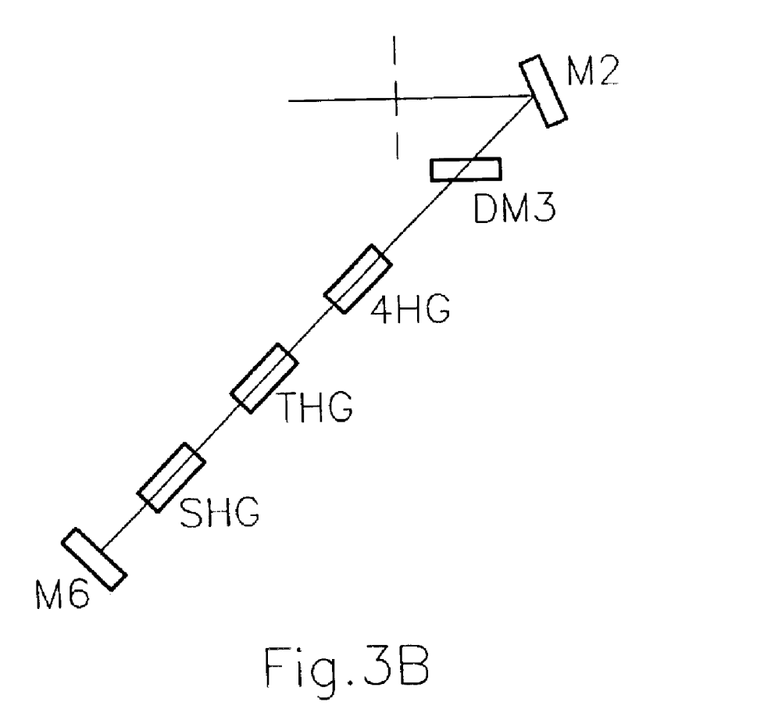

Referring to FIGS. 3A and 3B, alternative embodiments of the invention are shown. FIGS. 3A and 3B show alternative arms of the laser cavity of FIG. 2A beginning at mirror M2. Thus, a second harmonic pulsed laser having a controllable variable second harmonic output beam is shown in FIG. 3A. The fundamental beam reflected by mirror M2 is directed to a dichoric mirror DM1 which is highly transmissive for fundamental beam and highly reflective for second harmonic. A second harmonic generator SHG is provided in optical communication with fundamental beam transmitted by dichoric mirror DM1. Mirror M5 which is highly reflective for fundamental and second harmonic beam is provided in optical communication with second harmonic generator SHG. In operation, the fundamental beam passes through dichoric mirror DM1. The fundamental beam is transmitted by DM1 and directed through second harmonic generator SHG where a portion of the fundamental beam is converted to the secondary beam, in this instance, a second harmonic beam. The fundamental and second harmonic beam from the second harmonic generator SHG are reflected by mirror M5 back through second harmonic generator SHG where a further portion of the fundamental beam is converted to second harmonic beam. Mirror DM1 then reflects second harmonic beam pulse outside the cavity for end use. Fundamental beam is transmitted by DM1 for amplification by laser medium LM. According to the invention, a controllable variable pulsed energy second harmonic beam is provided. The beam is controlled and the modulator operates as described with regard to 2A and 2B.

FIG. 3B shows an another embodiment of the subject invention. Again, a device as shown in FIG. 2A is provided. However, the arm of the cavity from mirror M2 to mirror M6 is different. In the device of FIG. 3B, a fourth harmonic variable pulse energy laser is provided. The fundamental beam propagating from laser medium LM, as shown in FIG. 2A is directed through modulator M as described with regard to FIG. 2A. The fundamental beam is reflected by mirror M2 and directed to dichoric mirror DM3 which is highly transmissive of fundamental beam and highly reflective of UV beam, preferably, highly reflective of fourth harmonic beam, optionally, highly reflective of third and fourth harmonic beam. The fundamental beam is transmitted by dichoric mirror DM3 is directed through the fourth harmonic generator 4HG which is preferably a fourth harmonic crystal (1w+3w). Since the fourth harmonic generator only converts fundamental beam to fourth harmonic in the presence of third harmonic beam, the beam passes through 4HG unaffected. The fundamental beam is then directed through third harmonic generator THG (1w+2w=3w). Since the third harmonic generator THG only converts fundamental beam to third harmonic beam in the presence of second harmonic beam, the fundamental beam passes unaffected. The fundamental beam is then directed through second harmonic generator SHG where a portion of fundamental beam is converted to second harmonic. The beams propagating from second harmonic generator are then directed to mirror M6 which is highly reflective for fundamental and second harmonic. The beams are reflected back through second harmonic generator SHG where a further portion of the fundamental beam is converted to second harmonic beam. The second harmonic and fundamental beams are then directed through third harmonic generator where a substantial portion of second harmonic and a portion of the fundamental beam are converted to a third harmonic beam. The second and third harmonic and fundamental beams are then directed through fourth harmonic generator where a portion of the fundamental and third harmonic beams are converted to a fourth harmonic beam. The beams propagating from the fourth harmonic generator are then directed to dichoric mirror DM3. The fourth harmonic beam is reflected by dichoric mirror outside the cavity, preferably all UV beams are reflected outside the cavity as the output of the device. The fundamental beam is transmitted for amplification by laser medium LM. As a result, a pulsed secondary beam, namely a fourth harmonic UV beam is provided having a controlled variable pulse energy. The pulse energy is controlled as described with regard to FIGS. 2A and 2B.

Figure 4:
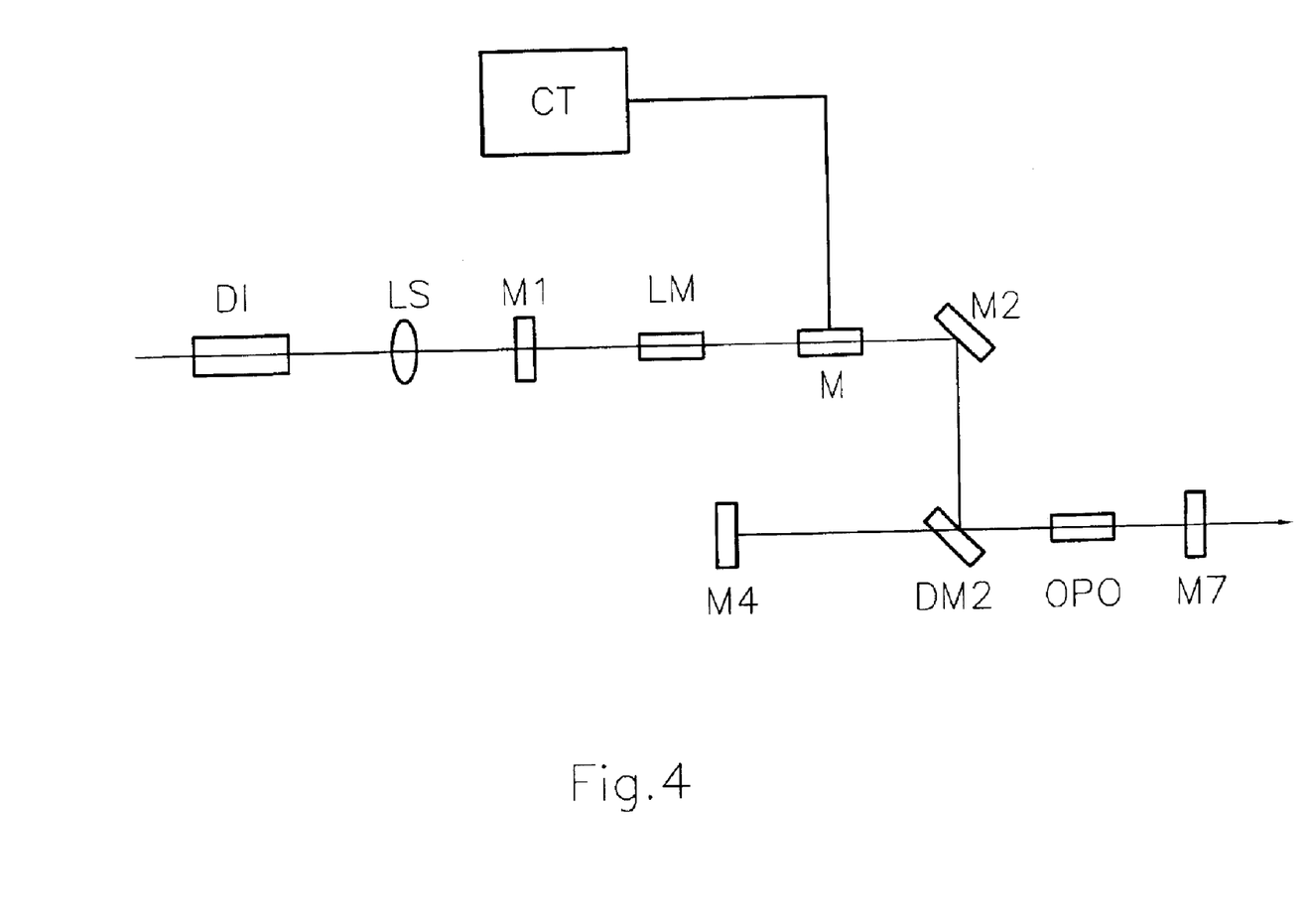
FIG. 4 is a schematic view showing an alternative embodiment of the laser according to the invention.

Referring to FIG. 4, a laser for providing an OPO output beam is provided. OPO cavities are shown in the art. Intracavitity OPO devices are shown in U.S. Pat. No. 6,108,356 which is incorporated by reference. As shown in FIG. 4, a laser cavity is provided between mirrors M1 and M7. Mirrors M1 and M7 are reflective, preferably highly reflective for fundamental (primary) beam in the laser cavity. A laser medium LM, desirably an Nd:YAG, Nd:YLF and Nd:YVO$_4$ crystal is provided within the cavity for lasing at a preselected fundamental beam wavelength. Desirably, a folding mirror M2 which is highly reflective for fundamental beam is provided within the optical cavity. A diode pump DP is provided to pump laser material LM through mirror M1 which is transmissive preferably highly transmissive to pump wavelength beams. An OPO resonator cavity is provided which desirably partially overlaps with the laser cavity between mirrors M1 and M7. The OPO cavity is provided between mirrors M4 which is highly reflective for Signal/or Idler beam and is located outside the optical laser cavity and mirror M7 which is one of the end mirrors providing the OPO cavity. Mirror M7 is highly reflective of fundamental beam and partially transmissive and partially reflective of signal/or idler wave-length beam. An OPO generator, preferably an OPO nonlinear crystal, for example, a KTP, KTA, LINBO$_3$ or other OPO nonlinear crystal is provided. A dichoric DM2 is provided in optical communication with mirror M2 and with mirrors M7 and M4. Dichoric mirror DM2 is highly reflective of fundamental laser beam and highly transmissive in both directions of either signal/or idler frequency beam. The OPO nonlinear crystal is selected depending on the wavelength of the fundamental beam from the lasing material and the desired longer wavelength output beam. Such crystals include BBO, LBO, KTP, KTA, RTA, KRTA and LINBO$_3$ crystals and the like. The nonlinear OPO crystal provided within the OPO optical cavity is desirably cut for phase matching conditions for fundamental wavelength as the pump source and signal/or idler wavelength. In the embodiment shown in FIG. 4, the fundamental beam wavelength can be for example applied by an Nd:YAG laser crystal having a fundamental wavelength of 1.06 um. An signal wavelength beam of 1.5 um can be for example produced by the OPO nonlinear crystal. A modulator M is provided within the optical cavity. Desirably as shown in FIG. 4, modulator M is provided between laser material LM and folding mirror M2. A controller CT is provided in communication with modulator M to control the degree of modulation as described in detail in connection with FIG. 2A. Modulator M can be selected from various appropriate modulators, desirably, an acoustooptic modulator or a electrooptic modulator, preferably an acoustooptic modulator.

In operation, the laser material is pumped by a diode DI. The pump beam is focused in lens system LS. Electromagnetic radiation propagating from the laser medium is directed through modulator M. The modulator M, depending on the type of modulator can deflect a portion of the laser beam for the acoustooptic modulator or change the polarization of electromagnetic radiation passing through the modulator when it is appropriately activated. The modulator M desirably has setting to fully transmit electromagnetic radiation which will result in producing the maximum laser pulse. As described in detail with regard to FIG. 2, acoustooptic or electrooptic modulators can be provided which can prevent lasing and which can control the pulse energy of the secondary beam. Electromagnetic radiation propagating through M is then directed to mirror M2 where it is reflected to dichoric mirror DM2. Fundamental beam is reflected by DM2 through OPO generator, desirably an OPO nonlinear crystal where the output (secondary-signal/or idler) beam is generated. Beams propagating from the OPO nonlinear crystal are directed to mirror M7 which is partially transmissive for the desired longer output wavelength beam. Desirably, mirror M7 is about 3% to 50% transmissive and partially reflective for output wave length beam(signal/or idler) desirably 97% to 50% and highly reflective for fundamental beam. The reflected fundamental and Output wavelength beam are reflected back through the OPO nonlinear crystal to mirror DM2 where the fundamental beam is reflected back to mirror M2 which reflects it back through the laser medium LM for amplification. The output beam is transmitted by dichoric mirror DM2 and directed to mirror M4 which reflects the output (secondary) beam back to dichoric mirror DM2 which transmits the output wave length beam back through the OPO nonlinear crystal.

The modulator M is operated as described with regard to FIG. 2. Modulator M can be an acoustooptic or electrooptic modulator. Desirably, the modulator is a acoustic modulator. Preferably, the pulse energy of the OPO generated output beam is controlled by varying the amplitude of the radio frequency supplied to the modulator and thereby control the pulse energy of the output (secondary) wave length beam.

The modulation according to the invention is different than the typical Q-switch. Instead of an on/off operation where only a single power output pulse is provided in typical of Q-switch modulation, a variable pulse energy of a secondary beam can be provided by varying the depth of modulation of a radio frequency or varying a voltage. In the acoustooptic modulator, a minimum amplitude is required for the radio frequency supplied to the modulator in order to generate sufficient loss in the laser to prevent lasing. Thus, by controllably lowering amplitude of the radio wave supplied to the modulator M from the point where lasing does not occur, the pulse energy of the harmonic beam can be controllably varied.

Figure 5B:
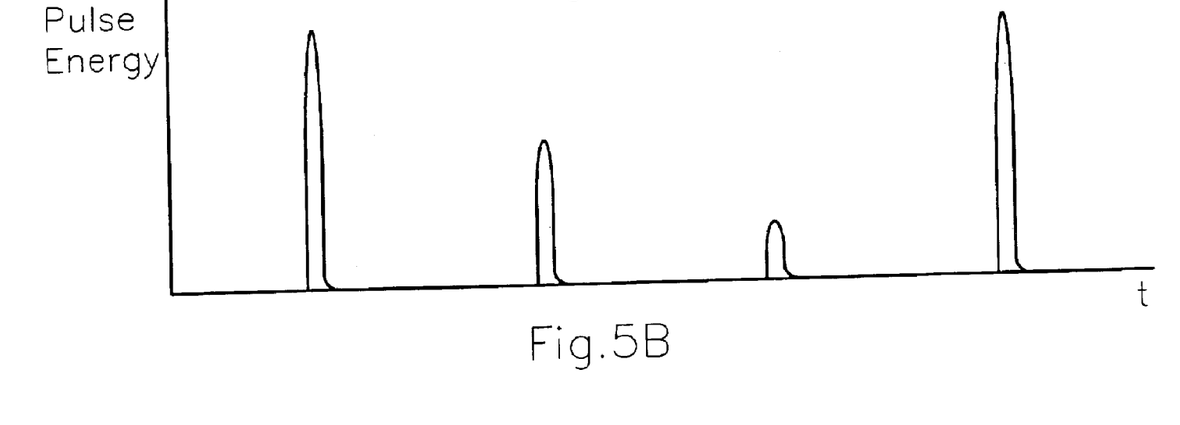

As best seen in FIGS. 5A and 5B, the relationship between the radio frequency, that is the RF power and the pulse energy of the harmonic beam verses time can be seen. FIG. 5A shows various radio frequency amplitudes and compares them in FIG. 5B to the pulse energy of secondary beam delivered verses time. Thus, the first pulse energy peak in FIG. 5B corresponds to a situation where the RF amplitude is at a minimum. The figure further shows that when amplitude is increased lasing is stopped. The second peak in FIG. 5B shows a time where an intermediate RF amplitude power is provided in between the amount necessary to completely block the lasing but still at a significant level. It can be seen that a smaller amount of pulse energy is produced corresponding to the lower pulse amplitude. The third peak shows the point where even a greater amount of RF power is provided and still, a smaller pulse energy of the secondary beam results.

Figure 6A:
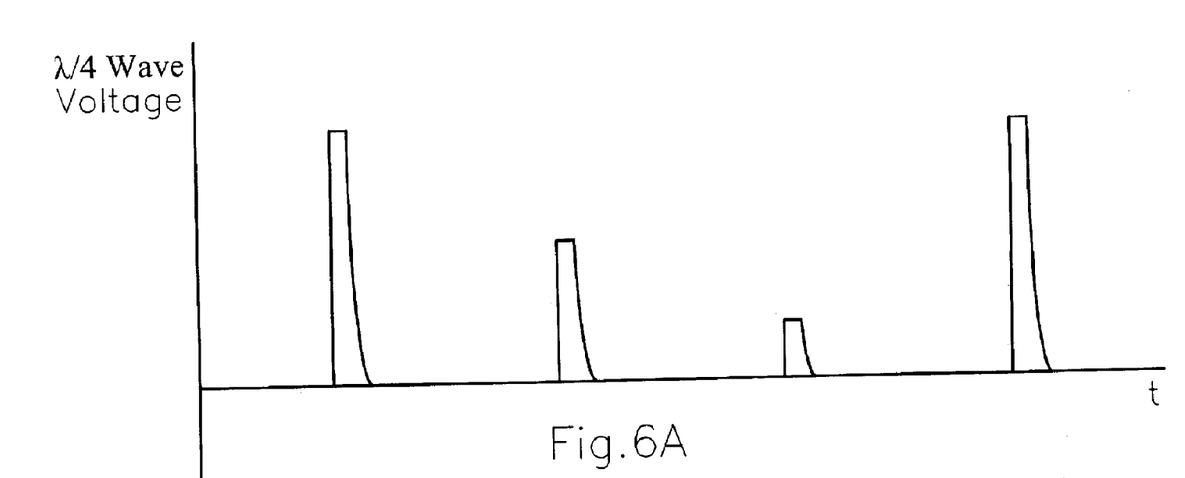
FIGS. 6A and 6B are graphs showing the relationship of voltage and pulse energy of the secondary beam for an electrooptic modulator according to the invention.
Figure 6B:
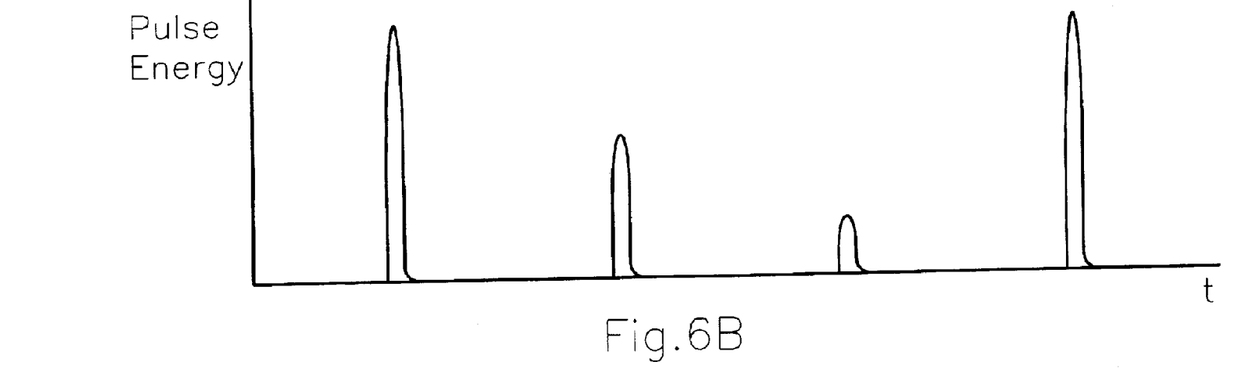

In an electrooptic situation, the pulse energy is related to the voltage and it can be seen that there is a similar relationship to the RF power depending on the voltage applied across the pockels cell. See FIGS. 6A and 6B.

Figure 7:
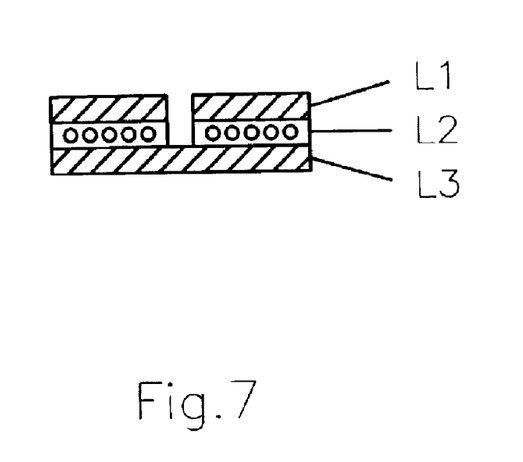
FIG. 7 is a sectional view of a circuit board drilled according to the invention.

As best seen in FIG. 7, a method for controlling at least two pulse energy levels UV beam for VIA hole drilling is provided. According to the invention, at least two layers of a printed circuit board L1 and L2 having at least one metal layer L1, and at least one dielectric layer L2 are drilled for example by the laser of FIG. 2. The UV laser emits a high pulse energy UV beam to drill through the metal layer L1. The pulse energy of the harmonic beam is lowered within the time period between two pulse interval, to drill through the dielectric layer L2 without damaging the surrounding area of dielectric layer L2 without changing the repetition rate of the laser. When multiple layers are present, the energy level of the second pulse is not enough to drill through the next metal layer L3.

The foregoing is considered as illustrative only to the principles of the invention. Further, since numerous changes and modification will occur to those skilled in the art, it is not desired to limit the invention to the exact construction and operation shown and described above, and accordingly all suitable modifications and equivalents may be resorted to, falling within the scope of the invention.

What is claimed is:

1. A pulsed laser comprising;
   a) a laser cavity formed between a first and second reflective surface;
   b) a laser medium located within said cavity producing a primary beam;
   c) one or more nonlinear crystals located within said cavity in optical communication with said laser medium for producing at least one secondary beam from said primary beam;
   d) a modulator located within said cavity, said modulator inducing a variable intracavity loss rate of the primary beam through a preselected range of loss rates; one of said loss rates in said range sufficient to prevent lasing of said laser medium;
   e) a controller for selectively varying the loss rate within said range induced by said modulator to vary the pulse energy of said secondary beam over a range of preselected pulse energies
   f) said preselected range of pulse energies including a maximum pulse energy and at least one pulse energy intermediate 0 and the maximum pulse energy.

2. A pulsed laser according to claim 1 wherein said modulator is an acoustooptic modulator;
   f) a transducer for supplying sound waves to said modulator; said sound waves having a preselected range of amplitudes in response to signals provided by said controller to selectively vary said loss rate of said primary beam within said preselected range;
   g) at least one of said amplitudes in said range having a height sufficient to deflect a sufficient portion of said primary beam to prevent lasing of said laser;
   h) said controller varying the amplitude of the sound wave supplied by said transducer over a preselected range of amplitudes to vary the pulse energy of said secondary beam over said range of preselected pulse energies; said pulse energy of said secondary beam dependent on the amplitude of the sound wave supplied to said modulator.

3. A pulsed laser according to claim 1 wherein said preselected range of pulse energy is from 0 to the maximum pulse energy supplied by said secondary beam when said intracavity loss rate provided by said modulator is 0.603

4. A pulsed laser according to claim 1 wherein said preselected range of pulse energies includes at least four different selectable pulse energies.

5. A pulsed laser according to claim 1 wherein said modulator is an electrooptic modulator.

6. A pulsed laser according to claim 5 wherein said electrooptic modulator includes:
   i) a polarizer in optical communication with said laser medium to discriminate in favor of a preselected polarization;
   ii) a pockels cell, said pockets cell in optical communication with said polarizer; said pockels cell rotating the polarization of said primary beam when a voltage is applied to said pockels cell to vary the amount of primary beam having said preselected polarization, the amount of rotation dependent on the amount of said voltage;
   iii) a voltage supply for supplying voltage over a preselected range of voltages to said pockels cell in response to signals from said controller; at least one of said voltages in said range preventing lasing of said laser;
   f) said controller varying the voltage supplied by said voltage supply over said preselected range of voltage to vary the pulse energy of said secondary beam over said range of preselected pulse energies; said pulse energy of said secondary beam dependent on the voltage supplied to said pockets cell.

7. A pulsed laser according to claim 6 wherein said preselected range of pulse energies is from 0 to the maximum pulse energy supplied by said secondary beam when said intracavity loss rate provided by said modulator is 0.

8. A pulsed laser according to claim 7 wherein said preselected range of pulse energies includes at least one pulse energy intermediate 0 and the maximum pulse energy.

9. A pulsed laser according to claim 7 said preselected range of pulse energy includes at least four (4) different pulse energies.

10. A pulsed laser according to claim 1 wherein said nonlinear crystal is a second harmonic nonlinear crystal.

11. A pulsed laser according to claim 10 wherein said secondary beam is a second harmonic beam.

12. A pulsed laser according to claim 1 wherein said nonlinear crystals are a second and third harmonic nonlinear crystal and said secondary beam is a third harmonic beam.

13. A pulsed laser according to claim 1 wherein said nonlinear crystals are second, third and fourth harmonic nonlinear crystals and said secondary beam is a fourth harmonic beam.

14. A pulsed laser according to claim 1 wherein said nonlinear crystal is an OPO nonlinear crystal and said secondary beam has a longer wave length then said primary beam.

15. A pulsed laser according to claim 1 wherein said laser medium is a Nd:YAG, Nd:YLF and Nd:YVO$_4$ crystal.

16. A pulsed laser according to claim 1 wherein said laser is pulsed at a constant repetition rate while said pulse energy is varying.

17. A method of providing a variable pulse energy laser beam;
   a) forming a laser cavity between a first and second reflective surface;
      i) said laser cavity including a laser medium producing a primary beam;
      ii) said laser cavity including one or more nonlinear crystals for producing at least one secondary beam from said primary beam and a modulator for controlling pulse energy of said secondary beam by varying the intracavity loss rate of the primary beam;
   d) varying the loss rate induced by said modulator over a preselected range to control the power output of said secondary beam over a preselected power output range f) said power output range includes a maximum power output, at least power output intermediate 0 and the maximum power output.

18. A method of providing a laser beam having a variable pulse energy comprising:
  a) forming a laser cavity between a first and second reflective surface; said laser cavity having
    i) a laser medium located within said cavity producing a primary beam;
    ii) one or more nonlinear crystals located within said cavity in optical communication with said laser medium for producing at least one secondary beam from said primary beam;
  b) pumping said laser medium;
  c) activating a modulator to induce a loss rate in said cavity to prevent lasing; said modulator located within said cavity, said modulator inducing a variable intracavity loss rate of the primary beam through a preselected range of loss rates corresponding to a preselected range of pulse energies of said secondary beam produced when said intracavity loss rate is induced by said modulator; one of said loss rates in said range sufficient to prevent lasing of said laser medium;
  d) selecting a first pulse energy of said secondary beam from said preselected range of pulse energies;
  e) changing the intracavity loss rate of said primary beam within said range of loss rates induced by said modulator to the loss rate corresponding to the selected pulse energy of said secondary beam;
  f) directing said secondary beam having said first pulse energy outside said cavity;
  g) selecting a second pulse energy of said secondary beam from preselected range of pulse energies;
  h) changing the intracavity loss rate of said primary beam within said range of loss rates induced by said modulator to the loss rate corresponding to the selected second pulse energy of said secondary beam
  i) directing said secondary beam having said second pulse energy outside said cavity.

19. A method of providing a laser beam having a variable pulse energy according to claim 18 further comprising:
  in f) said secondary beam is directed to a layered target made of at least two layers of different materials for hole drilling;
  said first pulse energy of said secondary beam sufficient to drill a first top layer of said layered target;
  i) pulsing said first pulse energy beam to drill said top layer;
  j) said second pulse energy sufficient to drill a second lower layer;
  k) changing said pulse energy prior to the next pulse of said laser from said first pulse energy to said second pulse energy;
  l) pulsing said second pulse energy beam to drill said second layer.

20. A method of providing a laser beam having a variable pulse energy according to claim 19 wherein said layered target has at least three layers.

21. A method of providing a laser beam having a variable pulse energy according to claim 20 wherein said second pulse energy being too low to drill said third layer.

22. A method of providing a laser beam having a variable pulse energy according to claim 18 wherein in c) said modulator is an acoutooptic modulator activated by supplying sound waves to said modulator; said sound waves having a preselected range of amplitudes corresponding to said preselected range of pulse energies of said secondary beam, at least one of said amplitudes in said range deflecting a sufficient portion of said primary beam to prevent lasing;
  supplying said amplitude in said range to said modulator to prevent lasing;
    and in e) supplying a sound wave having the amplitude in said range corresponding to the selected pulse energy of said secondary beam to change said intracavity loss rate.

23. A method of providing a laser beam having a variable pulse energy according to claim 22 wherein said preselected range of pulse energies includes at least one pulse energy intermediate between 0 and the maximum pulse energy.

24. A method of providing a laser beam having a variable pulse energy according to claim 22 wherein said preselected range of pulse energies includes at least four different pulse energies.

25. A method of providing a laser beam having a variable pulse energy according to claim 24 wherein said laser is pulsed at a constant repetition rate while said pulse energy is varying.

* * * * *